US011333927B2

(12) United States Patent
Sasaki et al.

(10) Patent No.: US 11,333,927 B2
(45) Date of Patent: May 17, 2022

(54) IMAGE PROCESSING DEVICE, IMAGE CAPTURING DEVICE, AND IMAGE PROCESSING METHOD

(71) Applicant: KABUSHIKI KAISHA TOSHIBA, Tokyo (JP)

(72) Inventors: Takayuki Sasaki, Ota Tokyo (JP); Nao Mishima, Inagi Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 7 days.

(21) Appl. No.: 16/559,835

(22) Filed: Sep. 4, 2019

(65) Prior Publication Data

US 2020/0166807 A1    May 28, 2020

(30) Foreign Application Priority Data

Nov. 28, 2018 (JP) .............................. JP2018-222647

(51) Int. Cl.
*G02F 1/13357* (2006.01)
*G06T 7/90* (2017.01)
(Continued)

(52) U.S. Cl.
CPC .. *G02F 1/133609* (2013.01); *G02F 1/133606* (2013.01); *G06T 7/90* (2017.01);
(Continued)

(58) Field of Classification Search
CPC ......... G02F 1/133609; G02F 1/133606; G02F 1/1336; G02F 1/133601; G02F 1/1313;
(Continued)

(56) References Cited

U.S. PATENT DOCUMENTS

2002/0031263 A1* 3/2002 Yamakawa ............ H04N 1/409
382/199
2010/0079659 A1* 4/2010 Ono .................... H04N 5/23212
348/345

(Continued)

FOREIGN PATENT DOCUMENTS

EP    3093818 A2 * 11/2016 ............... G06T 5/50
JP    2004-37410 A    2/2004
(Continued)

OTHER PUBLICATIONS

Yang, J., Jiang, B., Ma, J., Sun, Y., Di, M. (2014). Accurate point spread function (PSF) estimation for coded aperture cameras. Proc. SPIE 9273, Optoelectronic Imaging and Multimedia Technology III, 92731. https://doi.org/10.1117/12.2072014. (Year: 2014).*

(Continued)

*Primary Examiner* — Ping Y Hsieh
*Assistant Examiner* — Daniella M. DiGuglielmo
(74) *Attorney, Agent, or Firm* — Finnegan, Henderson, Farabow, Garrett & Dunner L.L.P.

(57) ABSTRACT

According to one embodiment, an image processing device includes a hardware processor implemented by one or more processors. The hardware processor acquires a first image of a first object and a second image of a second object which is different from the first object, the images captured by an image capture processing device including an image capturing element and an optical system which images an object image on an image capturing surface of the image capturing element. The hardware processor measures a point spread function of the optical system based on the first image and the second image.

18 Claims, 15 Drawing Sheets

(51) Int. Cl.
G06T 11/00 (2006.01)
G02F 1/1335 (2006.01)
G02F 1/13 (2006.01)

(52) U.S. Cl.
CPC .......... G06T 11/001 (2013.01); *G02F 1/1313* (2013.01); *G02F 1/1336* (2013.01); *G02F 1/133601* (2021.01); *G06T 2207/30121* (2013.01)

(58) Field of Classification Search
CPC  G06T 7/90; G06T 11/001; G06T 2207/30121
USPC ........................................................ 382/100
See application file for complete search history.

(56) References Cited

U.S. PATENT DOCUMENTS

| | | | |
|---|---|---|---|
| 2011/0025728 A1* | 2/2011 | Baba | G09G 3/3426 345/690 |
| 2016/0301922 A1 | 10/2016 | Green et al. | |
| 2017/0054910 A1* | 2/2017 | Moriuchi | G06T 5/20 |
| 2018/0137638 A1 | 5/2018 | Taguchi et al. | |

FOREIGN PATENT DOCUMENTS

| | | | |
|---|---|---|---|
| JP | 2009-163642 A | | 7/2009 |
| JP | 2009163642 A | * | 7/2009 |
| JP | 2017-117076 A | | 6/2017 |
| JP | 2018-78517 A | | 5/2018 |

OTHER PUBLICATIONS

H. Ha, Y. Bok, K. Joo, J. Jung and I. S. Kweon, "Accurate Camera Calibration Robust to Defocus Using a Smartphone," 2015 IEEE International Conference on Computer Vision (ICCV), 2015, pp. 828-836, doi: 10.1109/ICCV.2015.101. (Year: 2015).*

Yang et al., "Accurate Point Spread Function (PSF) Estimation for Coded Aperture Cameras," Proc. of SPIE, 9273:92731E-1-E-9 (2014).

* cited by examiner

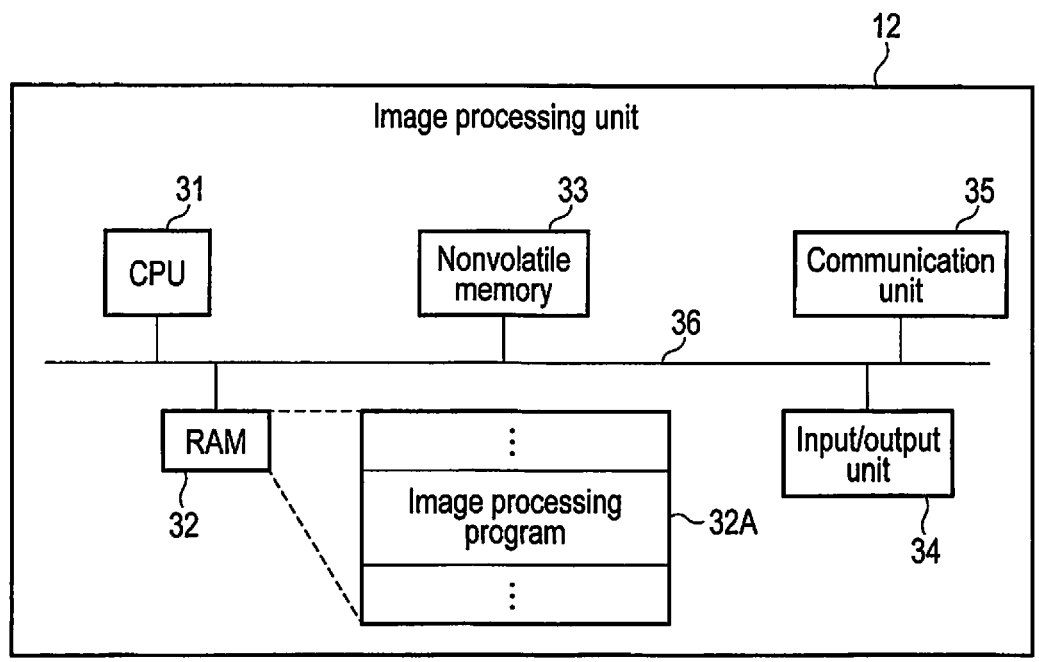
F I G. 2
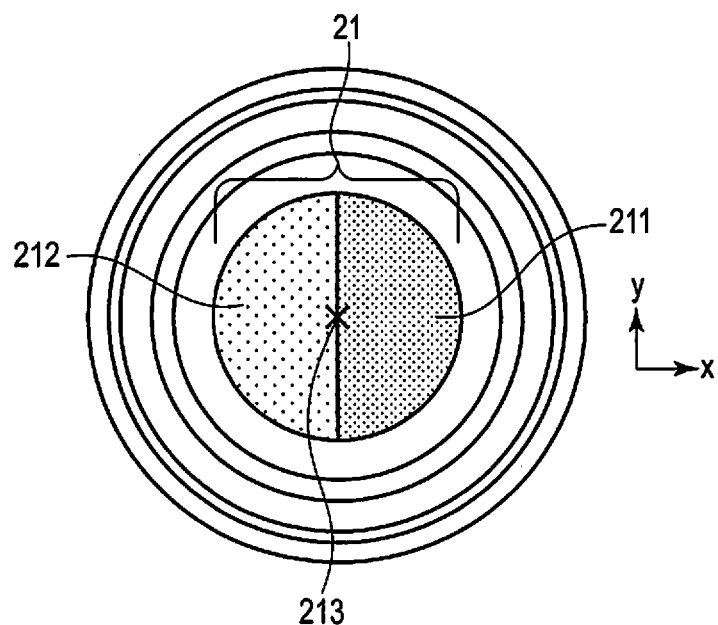
F I G. 3

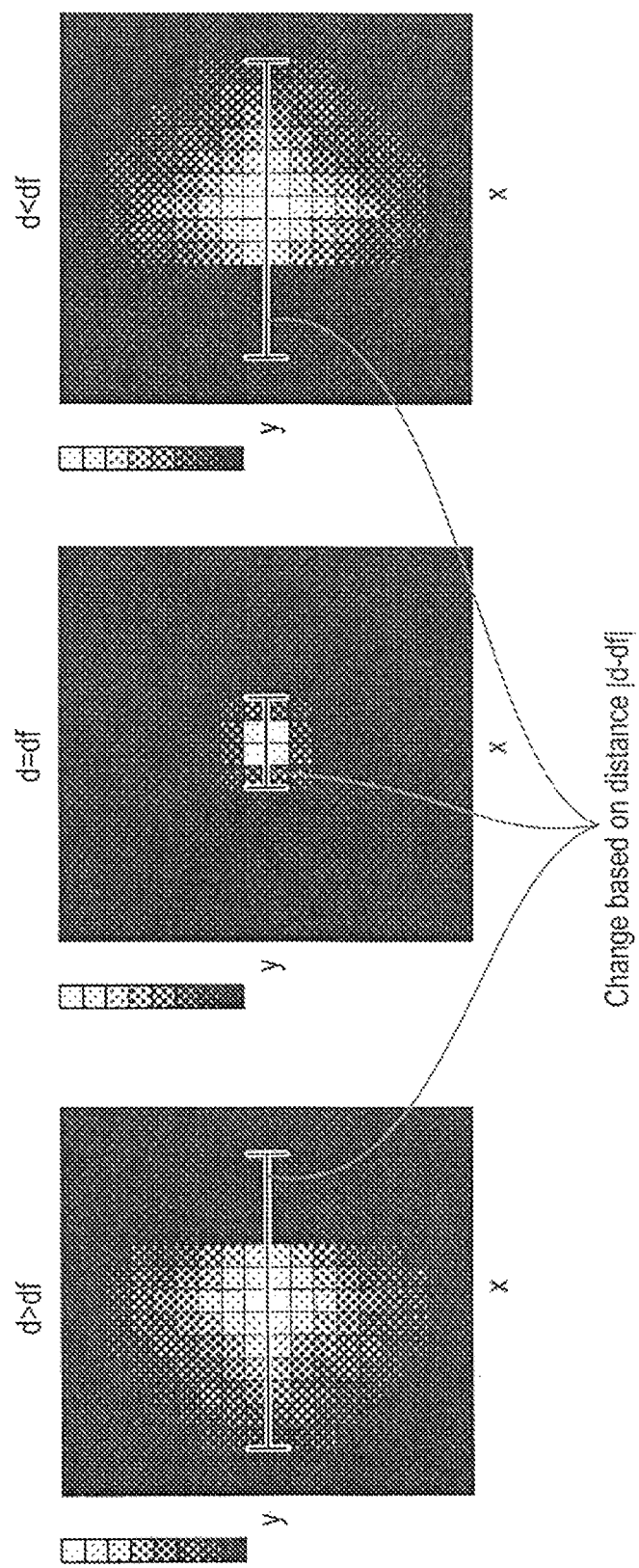
F I G. 8 d > df d = df d < df

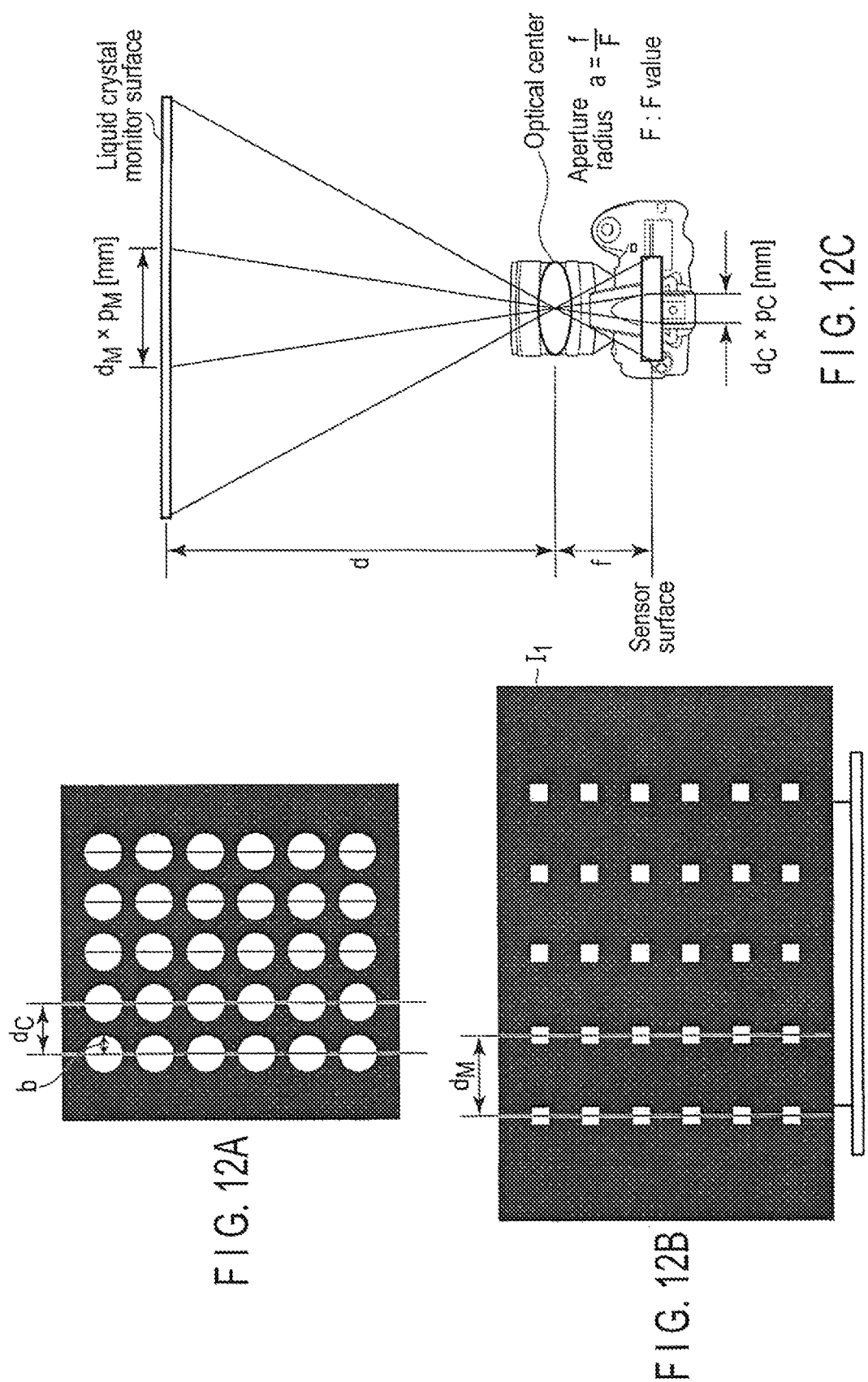

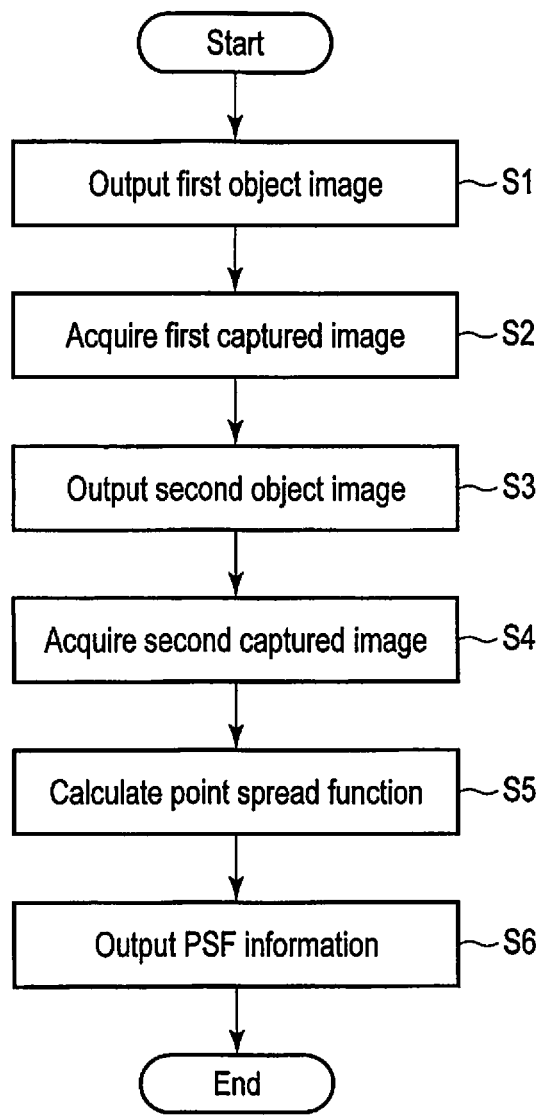
F I G. 21

IMAGE PROCESSING DEVICE, IMAGE CAPTURING DEVICE, AND IMAGE PROCESSING METHOD

CROSS-REFERENCE TO RELATED APPLICATIONS

This application is based upon and claims the benefit of priority from Japanese Patent Application No. 2018-222647, filed Nov. 28, 2018, the entire contents of which are incorporated herein by reference.

FIELD

Embodiments described herein relate generally to an image processing device, image capturing device, and an image processing method.

BACKGROUND

A technique for obtaining a distance to an object from images captured by two cameras or a stereo camera (binocular camera) is known. Furthermore, in recent years, there is a technique proposed to obtain a distance to an object from images captured by one camera (monocular camera).

As a method of obtaining a distance to an object from images captured by one camera at once, there is a technique of acquiring the distance using blur information. In this method, the distance is calculated using, for example, blur information obtained from the captured images and preliminarily-prepared correction filters. The correction filters are preliminarily prepared per distance using a point spread function (PSF) which is simplified.

However, such a simplified point spread function is different from a point spread function of an optical system of a camera, and thus, when a distance is calculated using the preliminarily-prepared correction filters, an error may possibly occur in the calculated distance. Thus, in order to improve the accuracy of the calculated distance, correction filters prepared using the point spread function of the optical system of the camera are desired instead of using the simplified point spread function. However, measurement of the point spread function of the optical system of the camera must be performed in consideration of influences from environmental light and a display system, and thus, is difficult to perform.

BRIEF DESCRIPTION OF THE DRAWINGS

FIG. 2 illustrates an example of a system structure of an image processing unit of the embodiment.

FIG. 3 illustrates an example of the structure of a filter of the embodiment.

FIG. 8 illustrates an example of a blur function of a target image of the embodiment.

FIG. 12A illustrates a gap between white pixels included in an object image of the embodiment.

FIG. 12B illustrates a gap between white pixels included in an object image of the embodiment.

FIG. 12C illustrates a gap between white pixels included in an object image of the embodiment.

FIG. 21 is a flowchart of an example of a PSF measurement process of the embodiment.

DETAILED DESCRIPTION

In general, according to one embodiment, an image processing device includes a hardware processor implemented by one or more processors. The hardware processor acquires a first image of a first object and a second image of a second object which is different from the first object, the images captured by an image capture processing device including an image capturing element and an optical system which images an object image on an image capturing surface of the image capturing element. The hardware processor measures a point spread function of the optical system based on the first image and the second image.

Embodiments will be described hereinafter with reference to the accompanying drawings. The following description presents some examples, and the inventions are not limited by the description. Changes which would easily been conceived by a person having ordinary skill in the art are naturally encompassed by the scope of invention. For further clarification, in the figures, dimensions of each element may be changed from the actual embodiments and schematically illustrated. In some figures, corresponding elements may be referred to by the same reference numbers and explanation considered redundant will be omitted.

Now, an image capturing device which can acquire a distance to an object from images captured by one camera (monocular camera) including an optical system will be explained.

Figure 1:
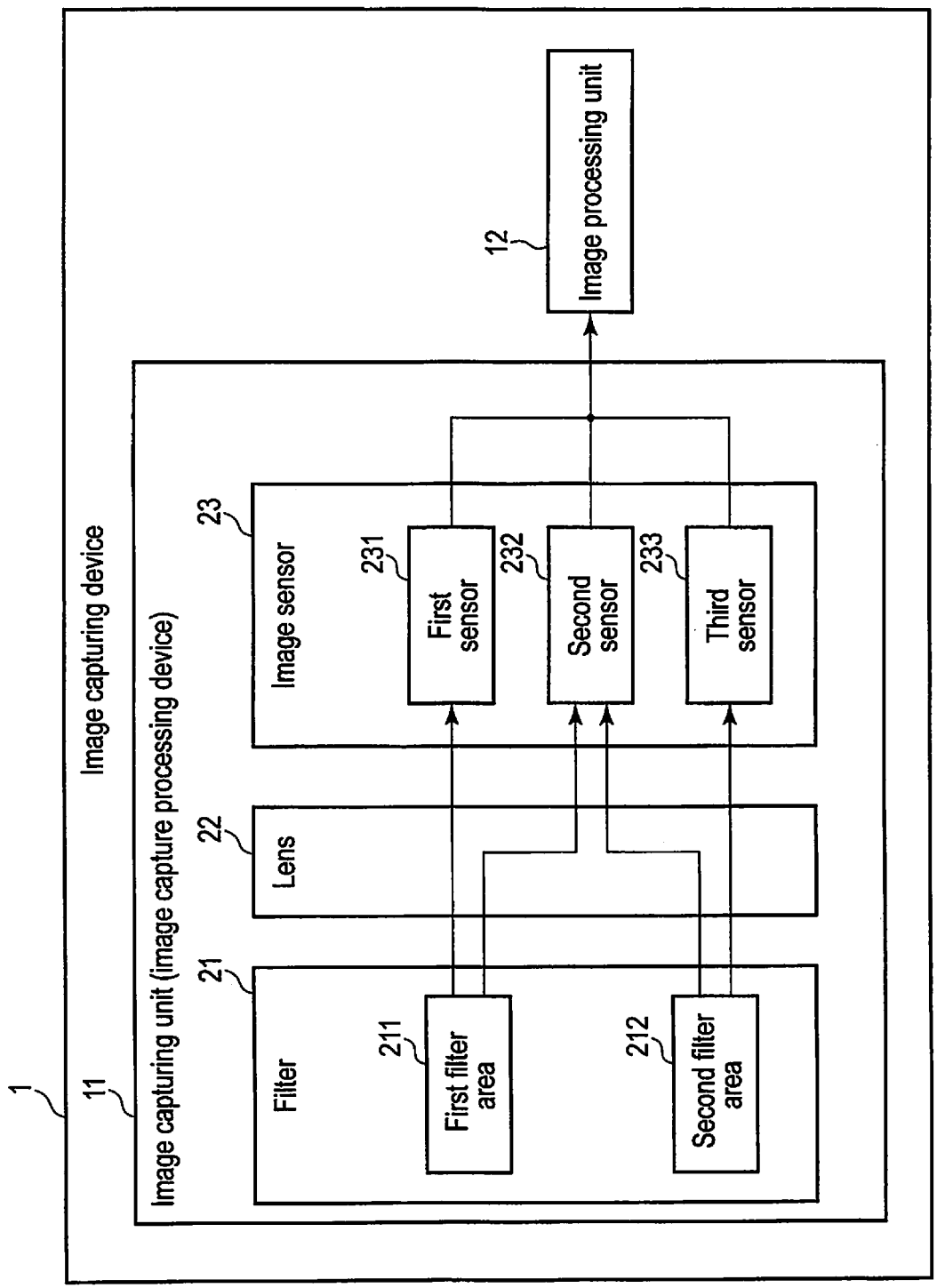
FIG. 1 illustrates an example of the structure of an image capturing device of an embodiment.

FIG. 1 illustrates an example of the structure of an image capturing device of an embodiment. Note that the image capturing device may be referred to as ranging device. The image capturing device 1 captures an image and calculates a distance from a point of image capturing to an object (may be referred to as a depth) using the captured image.

The image capturing device 1 includes an image capturing unit 11 configured to capture an image and an image processing unit 12 configured to process the captured image. The image capturing device 1 may be realized as a device including the image capturing unit 11 and the image processing unit 12, or may be a system including various devices such as an image capture processing device corresponding to the image capturing unit 11 and an image processing device corresponding to the image processing unit 12. The image capturing unit 11 has a function to acquire an image of an object and data related to a distance to the object at one image capturing. With this function, the image capturing unit 11 acquires, for example, an image in which the data of distance to the object at the image capturing time are encoded (hereinafter referred to as distance image). Furthermore, the image processing unit 12 may be realized as an incorporated system installed in a computer or various electronic devices, for example.

The image capturing unit 11 includes, as in FIG. 1, a monocular camera including a filter 21, lens 22, and image sensor 23. The filter 21 includes a plurality of filter areas which pass light beams of different wave length bands (color components). The filter 21 includes, for example, a first filter area 211 and a second filter area 212 which are color filter areas of two different colors.

The image sensor 23 receives the light passing through the filter 21 and the lens 22 and converts the received light into electric signals (light-to-electricity conversion). As the image sensor 23, for example, charge coupled device (CCD) or complementary metal oxide semiconductor (CMOS) will be used. The image sensor 23 includes at least two kinds of image capturing elements, and in this example, includes a first sensor 231 including a red (R) light image capturing element, second sensor 232 including a green (G) light image capturing element, and third sensor 233 including a blue (B) light image capturing element. Each image capturing element receives light of corresponding wave length band and converts the received light into electric signals. Through the analogue/digital conversion of the electric signals, a color image can be generated. In the following description, color component images of R, G, and B components of an image (or wavelength component images) may be referred to as R image, G image, and B image. Note that, R, G, and B images may be generated using electric signals of image capturing element of each of red, green and blue. That is, the image capturing unit 11 can generate at least one of a color image, R image, G image, and B image in one image capturing (one shot).

FIG. 2 illustrates an example of the structure of a system of the image processing unit 12 of FIG. 1.

As in FIG. 2, the image processing unit 12 includes a CPU 31, RAM 32, nonvolatile memory 33, input/output unit 34, and communication unit 35, and includes a bus 36 which mutually connect the CPU 31, RAM 32, nonvolatile memory 33, input/output unit 34, and communication unit 35.

The CPU 31 is a hardware processor which controls operations of various components in the image processing unit 12. The CPU 31 may be a single processor or may include a plurality of processors. The CPU 31 executes various programs loaded from the nonvolatile memory 33 to the RAM 32. The programs include an operating system (OS) and various application programs. The application program includes an image processing program 32A. The image processing program 32A includes a command group to calculate a distance from a point of image capturing to an object using at least one captured image of the object. Furthermore, the RAM 32 is a storage medium used as a main storage device. The nonvolatile memory 33 is a storage medium used as an auxiliary storage device.

The input/output unit 34 is a module to execute inputs/outputs such as input of an image from the image capturing unit 11, input of instructions from a user, and output of a display screen to a display unit which is not shown. Instructions from a user may be input based on an operation to a keyboard, pointing device, operation button, and the like. Or, if the display unit which is not shown is a touch screen display, instructions from a user may be input based on a touch operation on the touch screen display.

The communication unit 35 is a device configured to execute wired or wireless communication. The communication unit 35 includes a transmitter which transmits signals and a receiver which receives signals. The communication unit 35 executes communication to the external devices through a network and communication with external devices around thereof. The external devices may include the image capturing unit 11 (image capture processing device). That is, the communication unit 35 may receive images from the image capturing unit 11.

Now, an example of the structure of the filter 21 of FIG. 1 with reference to FIG. 3.

The filter 21 has the filter areas that transmit light rays having different wavelength bands (color components), and two or more filter areas are point-asymmetric with respect to an optical center 213 of an image capturing device 1. The filter 21 includes, for example, filter areas of two colors: the first filter area 211 and the second filter area 212. The center of the filter 21 corresponds to the optical center 213 of the image capturing device 1 (lens 22). Each of the first filter area 211 and the second filter area 212 has a shape point-asymmetric with respect to the optical center 213. For example, the two filter areas 211 and 212 do not overlap, and the two filter areas 211 and 212 constitute the entire area of the filter 21. In the example of FIG. 3, each of the first filter area 211 and the second filter area 212 has a semicircular shape formed by dividing the circular filter 21 by a line through the optical center 213.

For example, the first filter area 211 is a yellow (Y) filter area, and the second filter area 212 is a cyan (C) filter area. Note that the first filter area 211 may be a magenta (M) filter area, and the second filter area 212 may be a yellow (Y) filter area. Furthermore, the first filter area 211 may be a cyan (C) filter area, and the second filter area 212 may be a magenta (M) filter area.

The color filters transmit different wavelength bands. A part of a wavelength band of light rays that passes one filter area may have, for example, an overlap with a part of a wavelength band of light rays that passes another color filter area. A wavelength band of light rays that penetrates one color filter area may include, for example, a wavelength band of light rays that passes another color filter area.

Note that each of the first filter area 211 and the second filter area 212 may be a filter that changes transmissivity of any wavelength bands, or a polarized filter that allows light rays polarized in any directions to pass therethrough. Or, each filter area may be a microlens that changes light-condensing power of any wavelength bands. The filter that changes transmissivity of any wavelength bands may be, for example, a primary color filter (RGB), a complementary color filter (CMY), a color correction filter (CC-RGB/CMY), an infrared/ultraviolet cut filter, an ND filter, or a masking shield. In a case where the first filter area 211 and the second filter area 212 are microlenses, the lens 22 brings about biasing distribution of condensed light rays, which changes blur shapes.

Hereinafter, for easier understanding of explanation, mainly illustrated is a case where the first filter area 211 is a yellow (Y) filter area and the second filter area 212 is a cyan (C) filter area in the filter 21 illustrated in FIG. 3.

For example, the filter 21 in FIG. 3 being provided to an aperture of the camera configures a color aperture having a structure in which the aperture is divided into halves by two colors. Based on light rays that pass the color aperture, the image sensor 23 generates an image. The lens 22 may be disposed between the filter 21 and the image sensor 23 on an optical path of the light rays incident upon the image sensor 23. The filter 21 may be disposed between the lens 22 and the image sensor 23 on the optical path of the light rays incident upon the image sensor 23. In a case where lenses 22 are provided, the filter 21 may be disposed between two lenses 22.

Light rays having a wavelength band corresponding to the second sensor 232 pass both the first filter area 211 of yellow color and the second filter area 212 of cyan color. Light rays having a wavelength band corresponding to the first sensor 231 pass the first filter area 211 of yellow color and do not penetrate the second filter area 212 of cyan color. Light rays having a wavelength band corresponding to the third sensor 233 pass the second filter area 212 of cyan color and do not penetrate the first filter area 211 of yellow color.

Note that a state where light rays having a certain wavelength band pass a filter or a filter area represents that the filter or the filter area transmits the light rays having the wavelength band with high transmissivity, and the state indicates that attenuation of the light rays having the wavelength band due to the filter or the filter area (a decrease in light intensity) is extremely small. Furthermore, the state where light rays having a certain wavelength band do not pass a filter or a filter area represents that the light rays are shielded by the filter or the filter area: for example, the filter or the filter area transmits the light rays having the wavelength band with low transmissivity, and the state indicates that attenuation of the light rays having the wavelength band due to the filter or the filter area is extremely large. For example, a filter or a filter area absorbs light rays having a certain wavelength band so as to attenuate the light rays.

Figure 4:
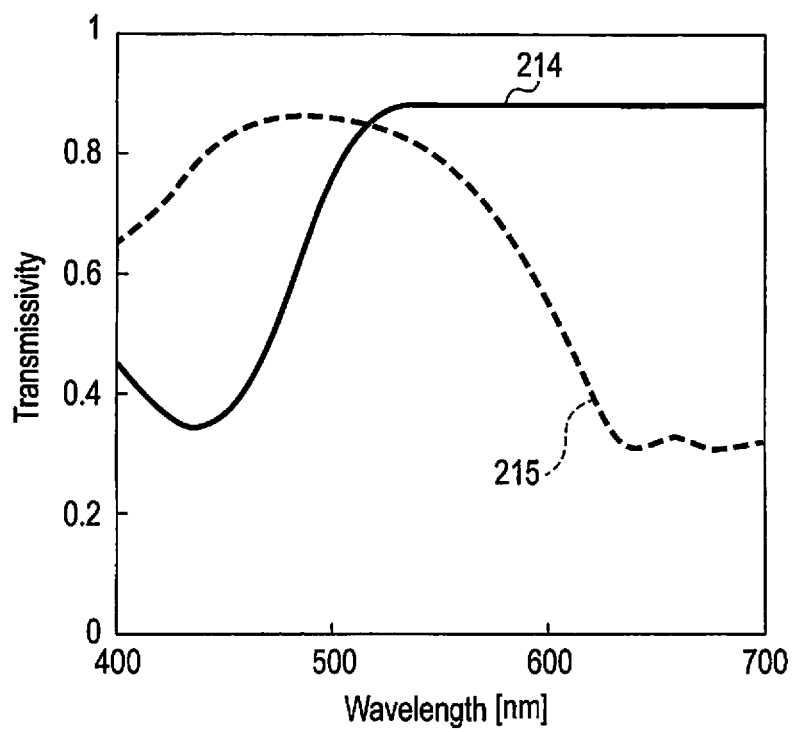
FIG. 4 illustrates an example of characteristics of transmissivity of the filter of the embodiment.

FIG. 4 illustrates exemplary transmissivity characteristics of the first filter area 211 and the second filter area 212. Although transmissivity with respect to light rays having a wavelength band longer than 700 nm in wavelength bands of visible light is not illustrated, it should be noted that the transmissivity is close to transmissivity with respect to a wavelength band of 700 nm. In a transmissivity characteristic 214 of the first filter area 211 of yellow color illustrated in FIG. 4, light rays having wavelength bands from about 620 nm to 750 nm corresponding to the R image and light rays having wavelength bands from about 495 nm to 570 nm corresponding to the G image are transmitted with high transmissivity, and light rays having wavelength bands from about 450 nm to 495 nm corresponding to the B image are hardly transmitted. In a transmissivity characteristic 215 of the second filter area 212 of cyan color, the light rays having the wavelength bands corresponding to the B image and the light rays having the wavelength bands corresponding to the G image are transmitted with high transmissivity, and the light rays having the wavelength bands corresponding to the R image are hardly transmitted.

Therefore, the light rays having the wavelength bands corresponding to the R image (the first sensor 231) pass the first filter area 211 of yellow color, and the light rays having the wavelength bands corresponding to the B image (the third sensor 233) pass the second filter area 212 of cyan color. The light rays having the wavelength bands corresponding to the G image (the second sensor 232) pass the first filter area 211 and the second filter area 212.

R and B images and blur shapes on the images change in accordance with a distance d to an object, specifically, in accordance with a difference between the distance d and a focusing distance $d_f$. The focusing distance $d_f$ is a distance from an image-capturing position to a focused position where an image is not blurred (that is, a position in focus). The filter areas 211 and 212 have a shape point-asymmetric with respect to the optical center 213 so that the blur shapes on the R and B images differ and shift depending on situations whether the object is on the near side or on the deep side from the focusing distance $d_f$. Directions of the shift in the blurs on the R and B images reverse depending on the situations whether the object is on the near side or the deep side from the focusing distance $d_f$ as seen from the image-capturing position.

Figure 5:
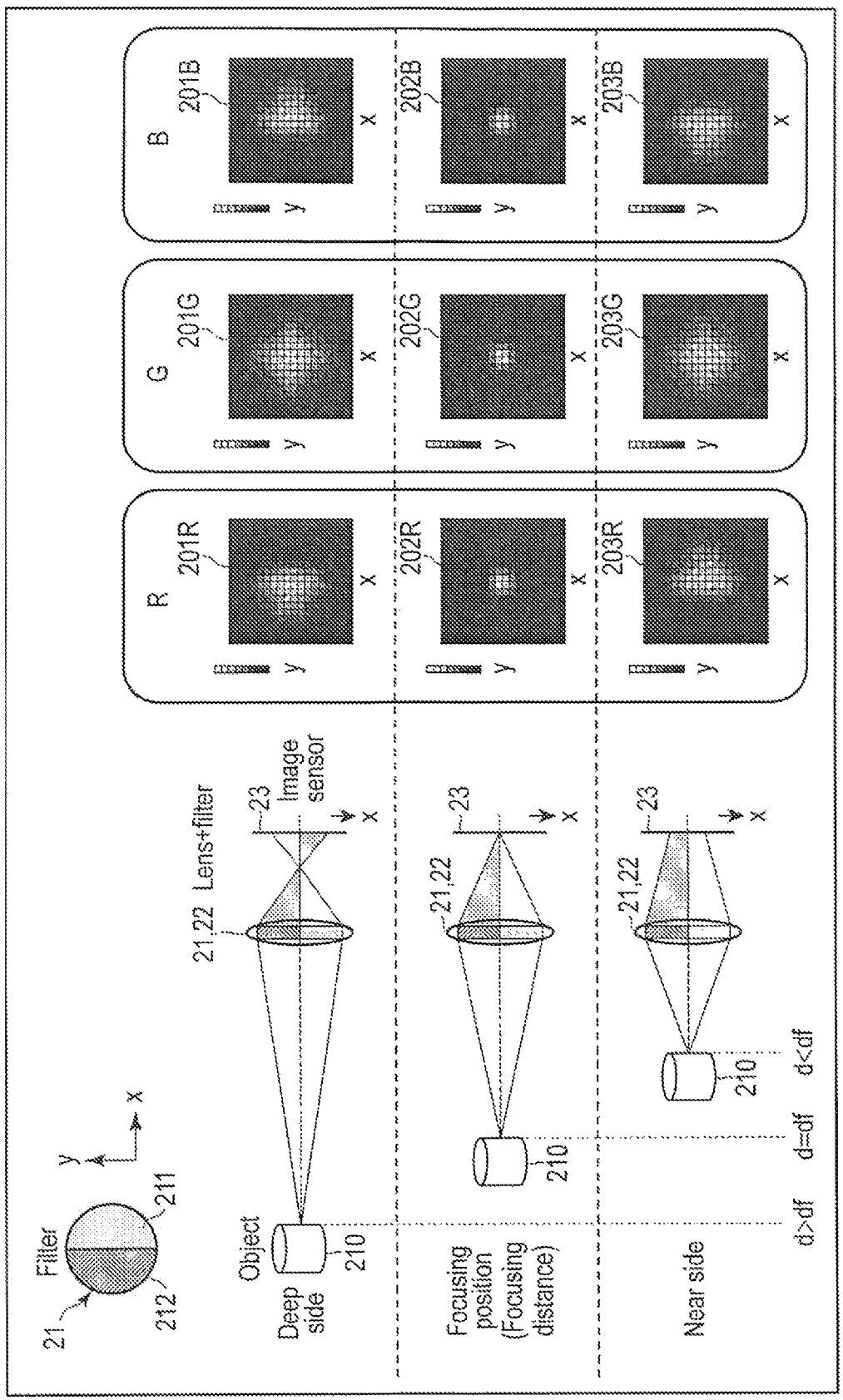
FIG. 5 illustrates changes of light rays by a color aperture in which the filter of the embodiment is disposed and shapes of blur.

Now, changes in light rays by a color aperture the filter 21 and blur shapes will be explained with reference to FIG. 5.

In a case where an object 210 is on the deep side from the focusing distance $d_f$ ($d>d_f$), images captured by the image sensor 23 are blurred. Blur functions (point spread functions: PSF) indicating blur shapes on the images differ between the R, G, and B images. For example, a blur function 201R of the R image indicates a blur shape shifted to the left, a blur function 201G of the G image indicates a balanced blur shape, and a blur function 201B of the B image indicates a blur shape shifted to the right.

When the object 210 is at the focusing distance $d_f$ ($d=d_f$), images captured by the image sensor 23 are hardly blurred. Blur functions indicating blur shapes on the images are substantially similar between the R, G, and B images. In other words, a blur function 202R of the R image, a blur function 202G of the G image, and a blur function 202B of the B image indicate balanced blur shapes.

When the object 210 is on the near side from the focusing distance $d_f$ ($d<d_f$), images captured by the image sensor 23 are blurred. Blur functions indicating blur shapes on the images differ between the R, G, and B images. In other words, a blur function 203R of the R image indicates a blur shape shifted to the right, a blur function 203G of the G image indicates a balanced blur shape, and a blur function 203B of the B image indicates a blur shape shifted to the left.

In this manner, when the object 210 is on the near side or on the deep side from the focusing distance $d_f$, the blur function 201R and the blur function 203R of the R image based on the light rays penetrating the first filter area 211 of yellow color are asymmetric, and the blur function 201B and the blur function 203B of the B image based on the light rays penetrating the second filter area 212 of cyan color are also asymmetric. The blur function 201R and the blur function 203R of the R image differ from the blur function 201B and the blur function 203B of the B image, respectively.

The image processing unit 12 (with the image processing program 32A therein) of the image capturing device 1 uses the above-explained characteristics and calculates a distance from an image-capturing position to an object.

Figure 6:
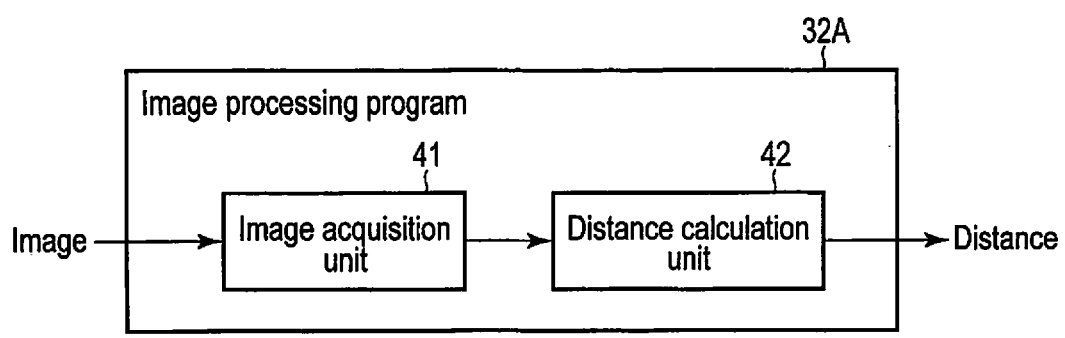
FIG. 6 illustrates an example of a functional structure of an image processing program of the embodiment.

FIG. 6 illustrates an example of the structure of functions of the image processing program 32A executed by the CPU 31 of the image processing unit 12. The image processing program 32A includes, for example, an image acquisition unit 41 and a distance calculation unit 42.

The image acquisition unit 41 acquires the G image in which the blur function indicates a balanced blur shape as a reference image. Furthermore, the image acquisition unit 41 acquires one or both of the R and B images in which the blur functions indicate shifted blur shapes as target images. The target image and the reference image are images captured by one image capturing device at the same time.

The distance calculation unit 42 chooses a blur correction filter which is added to the target image to increase a correlation with the reference image from a plurality of blur correction filters. The blur correction filters are functions to add different blurs to the target images. Now, a distance calculation process of the distance calculation unit 42 will be explained in detail.

The distance calculation unit 42 adds different blurs to the target images based on the target images and the reference image acquired and generates a corrected image in which the blur shapes of the target images are corrected. In this example, the distance calculation unit 42 uses the blur correction filters preliminarily prepared on the assumption that a distance to an object is optional, generates a corrected image in which blur shapes of target images are corrected, and derives a distance by which a correlation between the corrected image and the reference image becomes higher to calculate the distance to the object.

Figure 7:
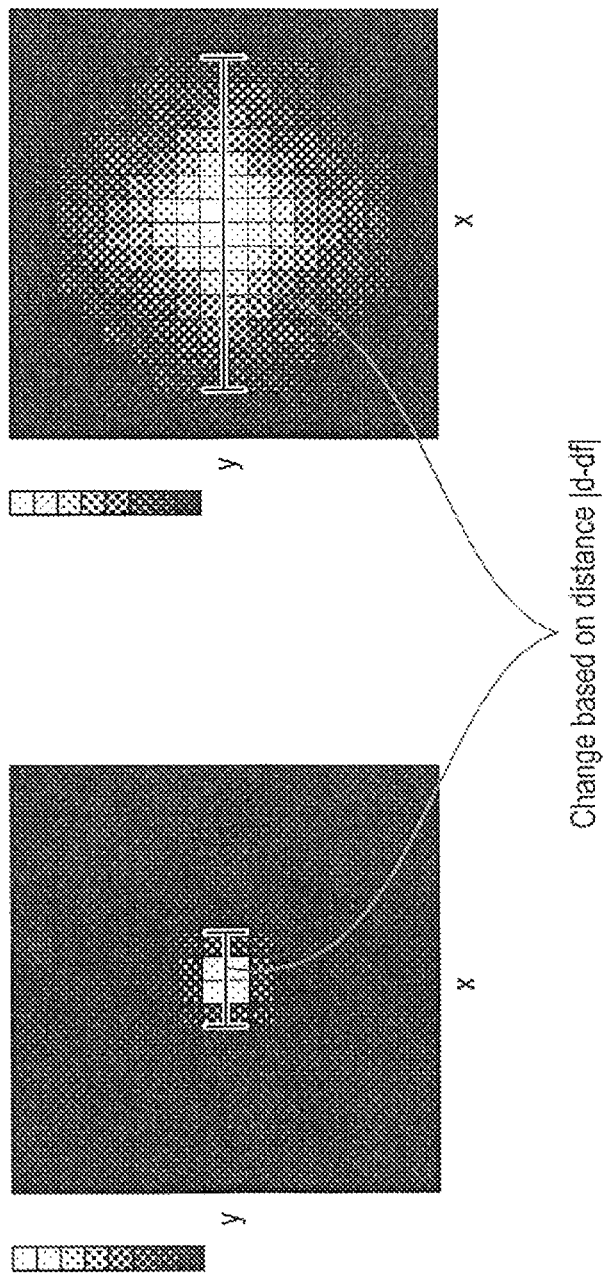
FIG. 7 illustrates an example of a blur function of a reference image of the embodiment.

The blur function of the captured image is determined based on a shape of aperture of the image capturing device 1 and a distance between an object position and a focusing position. FIG. 7 illustrates an example of the blur function of the reference image. As in FIG. 7, the shape of aperture through which the wave length area corresponding to the second sensor 232 is a symmetric circle, and the shape of blur indicated by the blur function does not change before and after the focus position, and the width of blur changes based on a size of the distance between the object and the focus position. The blur function indicating such a blur shape may be represented as a Gaussian function by which the blur width is changed based on a size of the distance between the object position and the focus position. Note that the blur function may be represented as a pillbox function by which the blur width is changed based on the distance between the object position and the focus position.

FIG. 8 illustrates an example of the blur function of the target image. Note that, in each graph, center $(x_o, y_o)=(0, 0)$. As in FIG. 8, the blur function of the target image (for example, R image) is represented as a one-side Gaussian function in which, if the object is in a farther side than the focus position: $d>d_f$, the blur width decreases by the light attenuation in the first filter area 211 where $x>0$. If the object is in a nearer side than the focus position: $d<d_f$, the blur function is represented as a one-side Gaussian function in which the blur width decreases by the light attenuation in the first filter area 211 where $x<0$.

Furthermore, by analyzing the blur function of the reference image and the blur function of the target image, a plurality of blur correction filters to correct the blur shape of the target image to the blur shape of the reference image can be derived.

Figure 9:
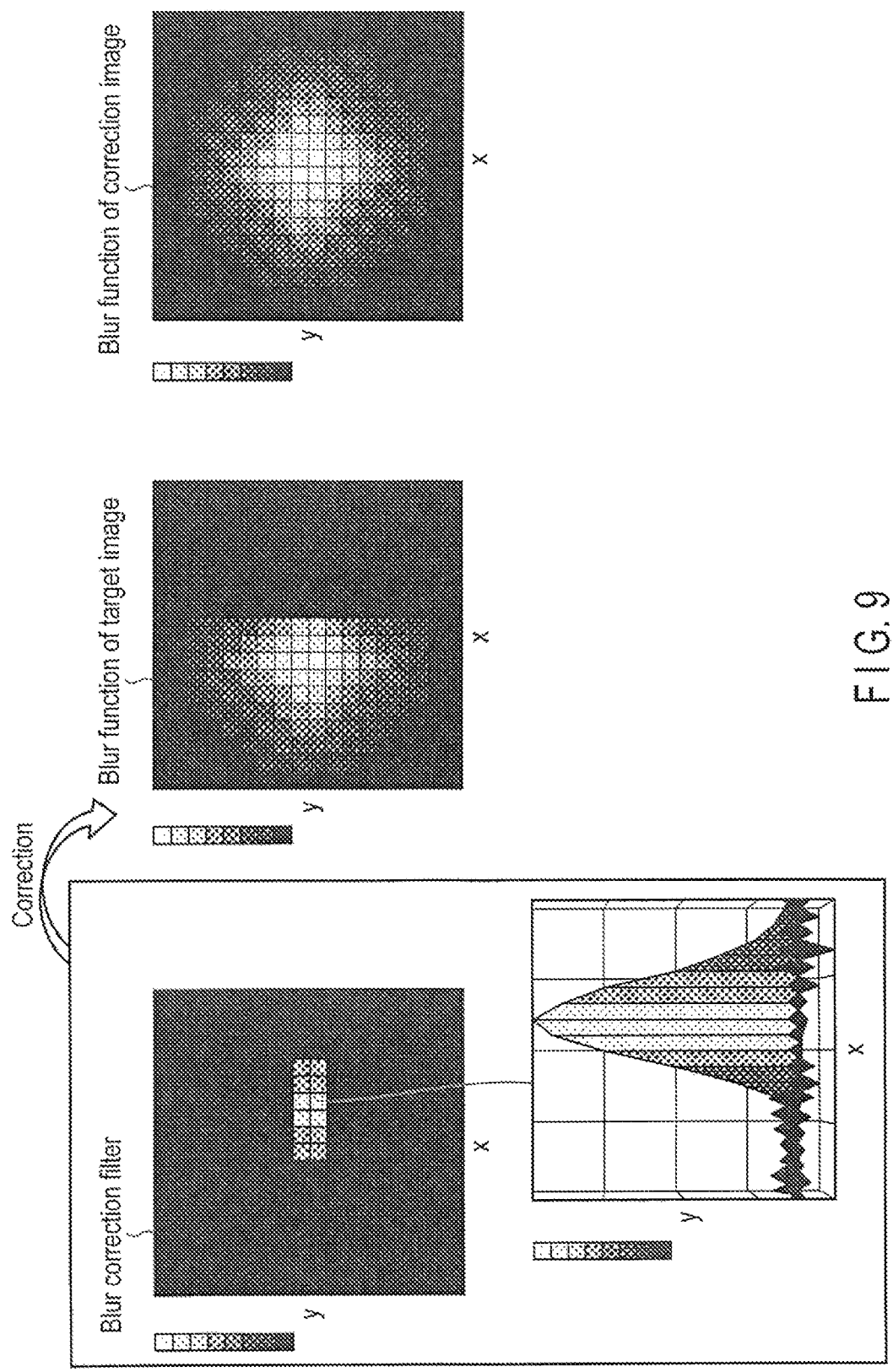
FIG. 9 illustrates an example of a blur correction filter of the embodiment.

FIG. 9 illustrates an example of the blur correction filter. Note that the blur correction filter of FIG. 9 is the blur correction filter in a case where the filter 21 of FIG. 3 is used. As in FIG. 9, the blur correction filter passes the center point of the boundary line between the first filter area 211 and the second filter area 212, and distributed on the straight line (proximity of straight line) which is orthogonal to the boundary line. The distribution draws a mountain-like shape as in FIG. 9 in which peak points (positions on the straight line, heights) and spread from the peak points differ per estimated distance. The blur shape of the target image can be corrected to various blur shapes at optional estimated distance using the blur correction filters. That is, correction images at optional estimated distances can be generated.

The distance calculation unit 42 derives a distance where the blur shape of the generated corrected image and the blur shape of the reference image are closest or matched from each pixel of the captured image. The matching degree of the blur shapes can be derived by calculating the correlation between the corrected image and the reference image in a rectangular area of optional size the center of which is each pixel. The matching degree of the blur shape is calculated with a conventional similarity evaluation method. The distance calculation unit 42 derives the distance by which the correlation between the corrected image and the reference image becomes maximum to calculate the distance to the object of each pixel.

For example, the conventional similarity evaluation method may be sum of squared difference (SSD), sum of absolute difference (SAD), normalized cross-correlation (NCC), zero-mean normalized cross-correlation (ZNCC), and color alignment measure, for example.

As above, the distance calculation unit 42 generates a corrected image in which a blur shape of a target image based on a filter area is corrected by a blur correction filter with an estimated distance, and acquires a distance by which correlation between the generated corrected image and a reference image is increased to derive a distance to an object.

As can be understood from the above, the image capturing device 1 can calculate a distance from an image-capturing position to an object based on blurs on captured images. In the image capturing device 1, in order to calculate the distance from the image-capturing position to the object, a plurality of blur correction filters to correct blur functions of target images to a blur function of a reference image are preliminarily stored in, for example, a nonvolatile memory 33. The blur correction filters are preliminarily derived using a simplified point spread function, and are preliminarily stored in the image capturing device 1. Specifically, a simplified point spread function is hypothetically set as a blur function derived from an image captured in a case where a distance to an object is a specific distance, and a blur correction filter is derived based on the specific distance. This is repeated for certain times to derive blur correction filters corresponding to various distances, and the blur correction filters are stored in the image capturing device 1.

However, the simplified point spread function is actually different from the blur function derived from the captured image, and thus, if a distance from an image-capturing position to an object is calculated using the blur correction filters derived based on the simplified point spread function, there may be an error occurring in the calculated distance. Thus, in order to improve the accuracy of acquisition of a distance to an object, what is required is a blur function actually derived from a captured image, that is, blur correction filters derived using a point spread function of an optical system of the camera instead of the simplified point spread function. However, the measurement of a point spread function of an optical system of the camera must be performed in consideration of influences from the environmental light and the display system, and thus, additional work steps are required.

For example, in a method of measuring a point spread function of an optical system of the camera, a point light source is disposed in a dark room, the point light source is image-captured, and a point spread function of the point light source is measured. However, in this method, a masking process to place a black paper having a pinhole between the point light source and the camera, or the like must be performed, which is an additional work step. Furthermore, the point spread function changes in accordance with a distance from the point light source to the camera, and thus, various point light sources must be disposed to capture images thereof. That is, moving of the point light sources must be performed at each time of image capturing, which is also an additional word step.

Inventors of the present application would like to present a novel method of measuring a point spread function of an optical system of a camera using a liquid crystal monitor including a divided backlight in order to solve the above-explained inconvenience.

Specifically, the inventors discovered a method in which a liquid crystal monitor pixel pitch of which is 0.2 mm or less displays an image in which only one pixel is white and the other pixels are black, and the image is captured by a camera, and a point spread function of the white pixel is measured. In this method, a size of one pixel is 0.2 mm×0.2 mm which is very small, and thus, one white pixel is regarded as a point light source, and the point spread function can be measured.

Figure 10A:
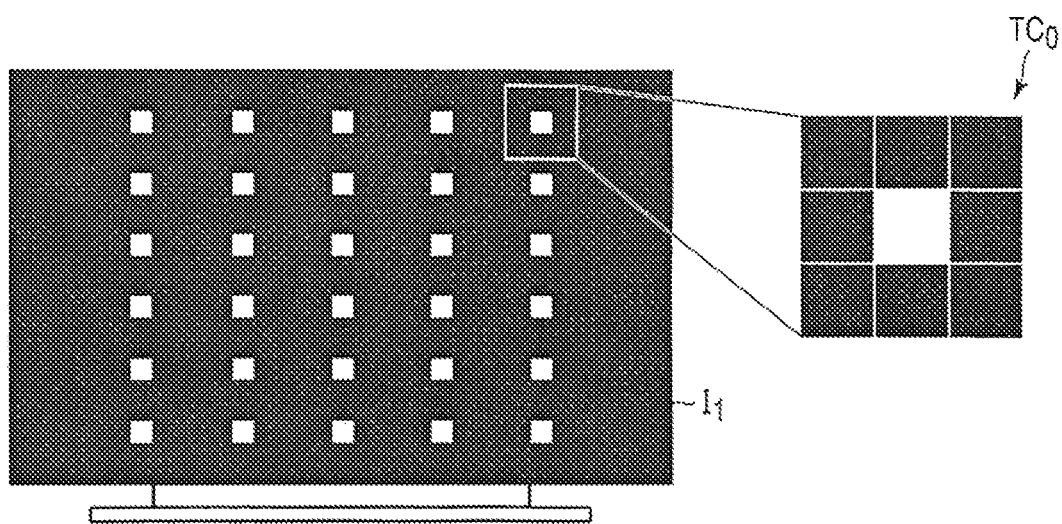
FIG. 10A illustrates a measurement method of a point spread function of the embodiment.

In the following description, the method will be further explained with reference to FIGS. 10A and 10B. In this method, as in FIG. 10A, a first image including one or more test charts $TC_0$ in each of which only one pixel is white (pixel value 255) and the other pixels are black (pixel value 0) is displayed in the liquid crystal monitor, and the first image $I_1$ is captured by a camera from a position distant therefrom by a first distance. Thereby, a first captured image is obtained. Note that FIG. 10A illustrates an example where the white pixels are arranged at regular intervals; however, the intervals between adjacent white pixels may be irregular. The intervals between adjacent white pixels will be described later.

Figure 10B:
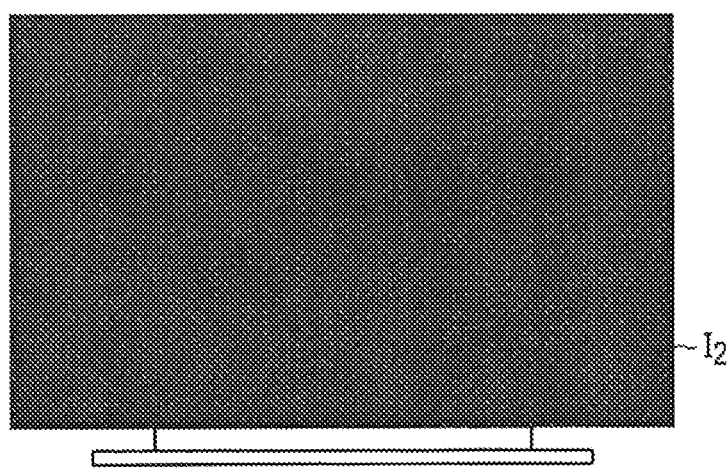
FIG. 10B illustrates a measurement method of a point spread function of the embodiment.

Then, as in FIG. 10B, a second image $I_2$ in which all pixels are black is displayed in the liquid crystal monitor, and the second image $I_2$ is captured by the camera from a position distant therefrom by the first distance. Thereby, a second captured image is obtained. Then, a difference between the first captured image and the second captured image is derived to measure a point spread function of the white pixel regarded as the point light source.

Through this method, through displaying the first image $I_1$ including a large number of test charts $TC_0$ on the liquid crystal monitor, a plurality of point spread functions can be measured at once. Furthermore, by simply changing the first image $I_1$ to be displayed on the liquid crystal monitor, display positions of the white pixels regarded as the point light source can be changed, and thus, a work step to move the point light sources (specifically, a work step to move the point light source in the horizontal direction orthogonal to the direction of the distance between the point light sources and the camera) can be reduced.

Figure 11A:
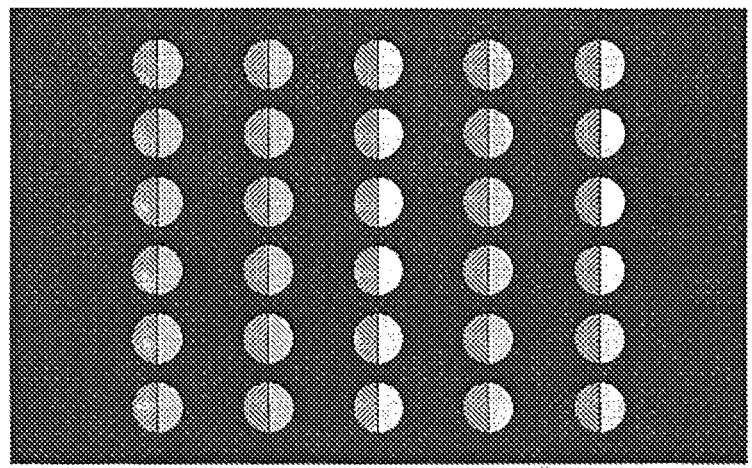
FIG. 11A illustrates an example of a captured image captured by an image capturing unit of the embodiment.
Figure 11B:
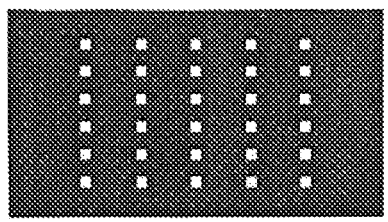
FIG. 11B illustrates an example of a captured image captured by an image capturing unit of the embodiment.
Figure 11C:
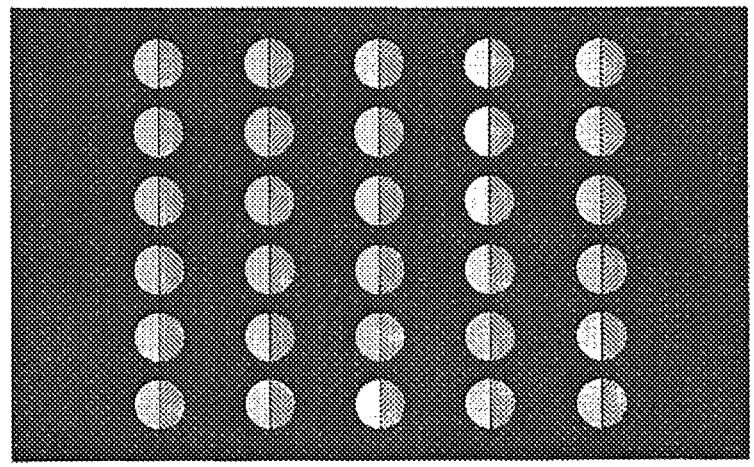
FIG. 11C illustrates an example of a captured image captured by an image capturing unit of the embodiment.

FIGS. 11A to 11C illustrate an example of a first captured image obtained by displaying the first image $I_1$ including a large number of test charts $TC_0$ and capturing the first image $I_1$ using the camera corresponding to the image capturing unit 11 of FIG. 1. FIG. 11A illustrates a first captured image in a case where the first image $I_1$ (liquid crystal monitor) as an object is in a deep side from the focusing distance $d_f$ ($d>d_f$). FIG. 11B illustrates a first captured image in a case where the object is in the focusing distance $d_f$ ($d=d_f$). FIG. 11C illustrates a first captured image in a case where the object is in a near side of the focusing distance $d_f$ ($d<d_f$).

In the camera corresponding to the image capturing unit 11, light rays change at the color aperture in which the circular filter 21 is disposed, and thus, as in FIGS. 11A and 11C, the shifting of the blurs are reversed based on whether the object is in the near side of the focusing distance $d_f$ or the object is in the deep side from the focusing distance $d_f$. Shapes of blurs of FIGS. 11A to 11C correspond to, point spread functions corresponding to a distance from the camera to each point light source (white pixel). Note that, for convenience of explanation, FIGS. 11A to 11C illustrate a first captured image including a large number of blurs of same shape; however, in actual cases, shapes of blurs included in the first captured image differ in accordance with distances from the camera.

As in FIGS. 11A to 11C, in a case where the first image $I_1$ including a large number of test charts $TC_0$ is displayed on the liquid crystal monitor, if intervals between the white pixels included in the test charts $TC_0$ are too narrow, on the first captured image, a shape of blur corresponding to a white pixel included in a test chart $TC_0$ may possibly overlap a shape of blur corresponding to a white pixel included in another test chart $TC_0$ which is adjacent to the test chart $TC_0$. Such an overlap may cause a failure of measurement of a point spread function. Thus, on the first image $I_1$, an interval $d_M$ between adjacent white pixels should preferably be greater than the following minimum value $d_{Mmin}$.

The shape of blur (size of blur) on the first captured image changes in accordance with a distance d from the camera to a white pixel as an object. Specifically, as in FIGS. 11A to 11C, when the distance d from the camera to a white pixel approaches the focusing distance $d_f$, the size of the blur on the first captured image decreases, and when the distance d departs from the focusing distance $d_f$, the size of the blur on the first captured image increases.

The size of the blur on the first captured image can be formulated as the following formula (1). In formula (1), b represents a size (radius) of the blur, a (=f/F, f: focusing distance, F: F value) represents an aperture diameter of the lens of the camera, $p_c$ represents a pixel pitch of an image sensor of the camera, and d represents a distance from the camera to a white pixel.

$$b = \frac{af}{2p_c} \left| \frac{1}{d_f} - \frac{1}{d} \right| \qquad (1)$$

In order to prevent two blur shapes corresponding to two adjacent white pixels from overlapping each other, as in FIG. 12A, an interval $d_c$ between two adjacent white pixels should be greater than 2b on the first captured image.

Now, as in FIG. 12B, an interval between two adjacent white pixels on the first image $I_1$ is $d_M$, and a pixel pitch of the liquid crystal monitor on which the first image $I_1$ is $p_M$, as in FIG. 12C, a similar relation of the following formula (2) can be derived from the first captured image, first image $I_1$, and various parameters of the camera.

$$f{:}d = d_c{\times}p_c{:}d_M{\times}p_M \qquad (2)$$

Formula (2) can be rewritten into formula (3) as follows.

$$d_c = \frac{f \times d_M \times p_M}{u \times p_c} \qquad (3)$$

As described above, in order to prevent overlapping of two blur shapes corresponding to two adjacent white pixels, an interval $d_c$ between two adjacent white pixels on the first captured image is greater than 2b, and thus, a minimum value $d_{Mmin}$ of the interval between two adjacent white pixels on the first image $I_1$ is, based on formulae (1) and (3), derived as formula (4) as follows.

$$\frac{f \times d_{Mmin} \times p_M}{u \times p_c} = 2b = \frac{af}{p_c}\left|\frac{1}{d_f} - \frac{1}{d}\right| \qquad (4)$$

$$\Leftrightarrow d_{Mmin} = \frac{a}{p_M}\left|\frac{d - d_f}{d_f}\right|$$

As explained above, the first image $I_1$ including a large number of test charts $TC_0$ arranged such that an interval between two adjacent white pixels is greater than the above $d_{Mmin}$ can be displayed, and thus, a plurality of point spread functions can be measured at once.

However, it was revealed that the above measurement method cannot remove an influence of backlight of the liquid crystal monitor (in other words, influence of a display system), and a true and accurate point spread function is not measurable, and thus, it is inconvenient.

In the following description, this inconvenience will be described. The first image $I_1$ of FIG. 10A, that is, the first image $I_1$ including one white pixel in an optional area x is represented as $g_1(x)$, an influence of the backlight of the liquid crystal monitor lit to display the one white pixel is represented as $h(x)$, and influence of an environment at the time of image capturing of the first image $I_1$ (hereinafter referred to as ambient image influence) is represented as $k(x)$. In that case, the first captured image will be represented as formula (5) as follows.

$$\text{First captured image} = f * g_1(x) + h(x) + k(x) \qquad (5)$$

Figure 13:
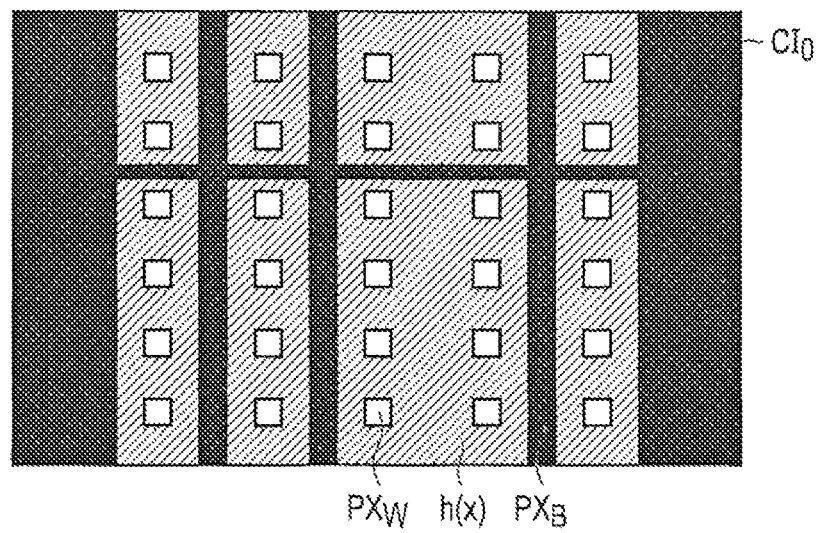
FIG. 13 illustrates an example of a captured image acquired by image capturing an object image displayed on a liquid crystal monitor of the embodiment.

As indicated in formula (5), the first captured image is generated by convolution of the point spread function corresponding to the first distance with respect to the first image $I_1$, wherein influence by a backlight and ambient image influence are added to a result of convolution (in other words, influence by light emitted from an object). FIG. 13 schematically illustrates a first captured image $CI_0$, wherein a white part represents a white pixel $PX_W$, a black part represents a black pixel $PX_B$, and a hatched part represents an influence $h(x)$ of the backlight.

The second capture image is obtained by image capturing a second image $I_2$ in which all pixels are black as in FIG. 10B. The second image $I_2$ does not include a white pixel which is regarded as a point light source, and thus, an influence by light emitted from the object is not added to the second captured image. Furthermore, in general, when only the black pixels are displayed, the backlight of the liquid crystal monitor is turned off (attenuated), and thus, an influence by the backlight of the liquid crystal monitor is not added to the second captured image. That is, only the ambient image influence is added to the second captured image. If the environment at the time of image-capturing of the second image $I_2$ is the same as the environment at the time of image-capturing of the first image $I_1$, a difference between the first captured image and the second captured image will be represented as formula (6) as follows.

$$\begin{aligned}\text{First captured image} - \text{second captured image} &= \{f * g_1(x) + \\ & \quad h(x) + k(x)\} - \\ & \quad k(x) \\ &= f * g_1(x) + \\ & \quad h(x) \\ &= f(x) + h(x)\end{aligned} \qquad (6)$$

As can be understood from formula (6), in the method of measuring a point spread function using a liquid crystal monitor including a divided backlight, there is an inconvenience in which the influence $h(x)$ by the backlight of the liquid crystal monitor (corresponding to the hatched part of FIG. 13). In the following description, a measurement method of the point spread function which can solve the inconvenience will be explained.

Figure 14:
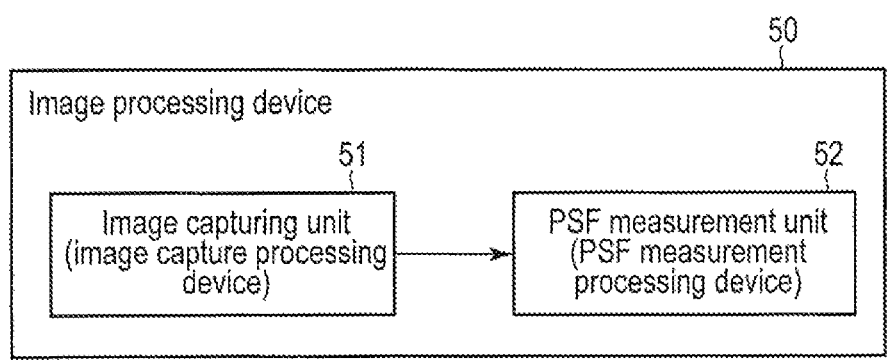
FIG. 14 illustrates an example of the structure of an image processing device of the embodiment.

FIG. 14 illustrates an example of the structure of an image processing device of the present embodiment. The image processing device 50 includes an image capturing unit 51 configured to capture an image, and a PSF measurement unit 52 configured to measure a point spread function by processing the captured image. The image processing device 50 may be realized as one device including both the image capturing unit 51 and the PSF measurement unit 52, or may be realized as a system including an image capture processing device corresponding to the image capturing unit 51 and a PSF measurement processing device corresponding to the PSF measurement unit 52. Furthermore, the image processing device 50 may be integrated in the image capturing device 1 of FIG. 1. In that case, since the image capturing unit 51 corresponds to the image capturing unit 11 of FIG. 1, only the PSF measurement unit 52 may be incorporated in the image capturing device 1.

The image capturing unit 51 includes a filter, lens, and image sensor, wherein the image sensor includes at least one type of image capturing element and an optical system which images an object image on an image capturing surface of the image capturing element. The PSF measurement unit 52 has a function to measure a point spread function corresponding to a certain distance in the optical system of the image capturing unit 51 based on the images captured by the image capturing unit 51. The PSF measurement unit 52 may be realized as an incorporated system stored in a computer or various electronic devices (for example, image capturing device 1).

Figure 15:
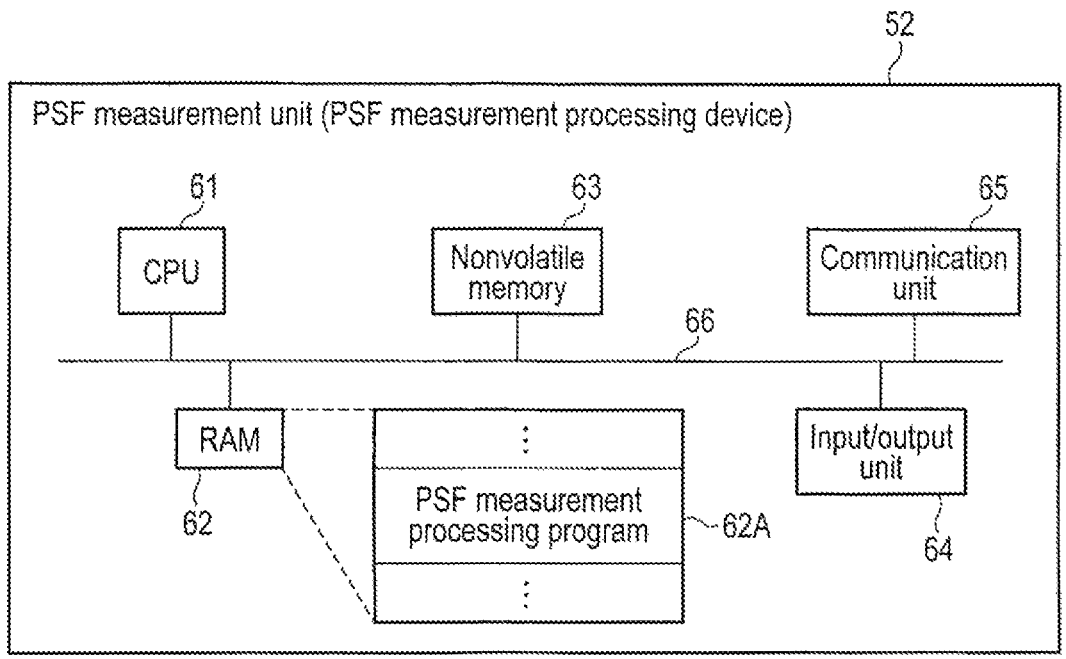
FIG. 15 illustrates an example of the system structure of a PSF measurement unit of the embodiment.

FIG. 15 illustrates an example of the structure of a system of the PSF measurement unit 52 of FIG. 14.

As in FIG. 15, the PSF measurement unit 52 includes a CPU 61, RAM 62, nonvolatile memory 63, input/output unit 64, and communication unit 65, and includes a bus 66 which mutually connect the CPU 61, RAM 62, nonvolatile memory 63, input/output unit 64, and communication unit 65.

The CPU 61 is a hardware processor which controls operations of various components in the PSF measurement unit 52. The CPU 61 may be a single processor or may include a plurality of processors. The CPU 61 executes various programs loaded from the nonvolatile memory 63 to the RAM 62. The programs include an operating system (OS) and various application programs. The application program includes a PSF measurement process program 62A. The PSF measurement process program includes a command group to measure a point spread function corresponding to a certain distance in the optical system of the image capturing unit 51 using the images captured by the image capturing unit 51. Furthermore, the RAM 62 is a storage medium used as a main storage device. The nonvolatile memory 63 is a storage medium used as an auxiliary storage device. In the nonvolatile memory 63, for example, object images of various kinds are stored.

The input/output unit 64 is a module to execute inputs/outputs such as input of an image from the image capturing unit 51, input of instructions from a user, and output of a display screen to a display unit which is not shown. Instructions from a user may be input based on an operation to a keyboard, pointing device, operation button, and the like. Or, if the display unit which is not shown is a touch screen display, instructions from a user may be input based on a touch operation on the touch screen display.

The communication unit 65 is a device configured to execute wired or wireless communication. The communication unit 65 includes a transmitter which transmits signals and a receiver which receives signals. The communication unit 65 executes communication to the external devices through a network and communication with external devices around thereof. The external devices may include the image capturing unit 51 (image capture processing device). That is, the communication unit 65 may receive images from the image capturing unit 51.

Figure 16:
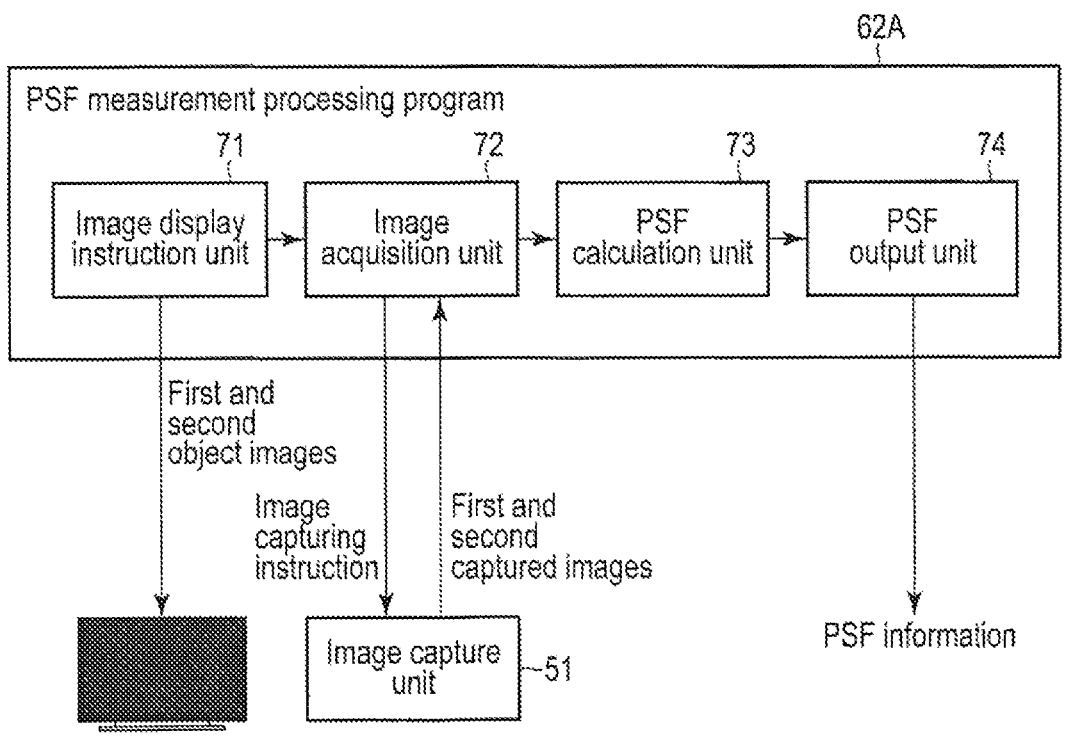
FIG. 16 illustrates an example of the functional structure of a PSF measurement processing program of the embodiment.

FIG. 16 illustrates an example of the structure of functions of PSF measurement process program 62A executed by the CPU 61 of the PSF measurement unit 52. The PSF measurement process program 62A includes, for example, an image display instruction unit 71, image acquisition unit 72, PSF calculation unit 73, and PSF output unit 74.

The image display instruction unit 71 has a function to instruct the liquid crystal monitor to display various kinds of object images. That is, the image display instruction unit 71 sequentially reads various kinds of object images which are preliminarily stored in the nonvolatile memory 63, and outputs the read object images and a display command to display the object images to the liquid crystal monitor through the communication unit 65.

Note that, in the nonvolatile memory 63, at least two kinds of object images, that is, a first object image and a second object image are preliminarily stored.

Now, the first object image and the second object image will be explained. Both the first and second object images include one or more test charts including one or more white pixels and a plurality of black pixels. The first object image includes one or more first test charts, and the second object image includes one or more second test charts. The first test charts include n+1 white pixels and a plurality of black pixels. The second test charts includes n white pixels and a plurality of black pixels. That is, the first and second test charts have a relationship in which a difference of white pixels therebetween is 1.

A specific example of a pair of the first and second test charts will be explained with reference to FIGS. 17A and 17B.

Figure 17A:
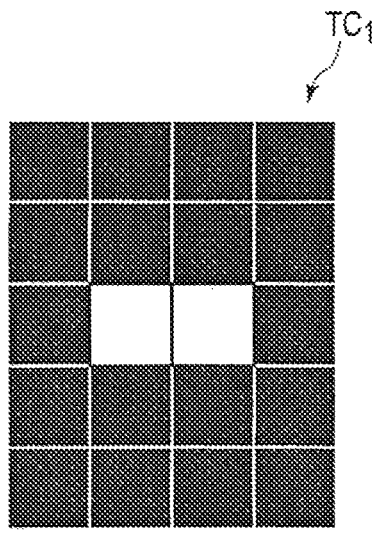
FIG. 17A illustrates an example of a pair of first and second test charts of the embodiment.
Figure 17B:
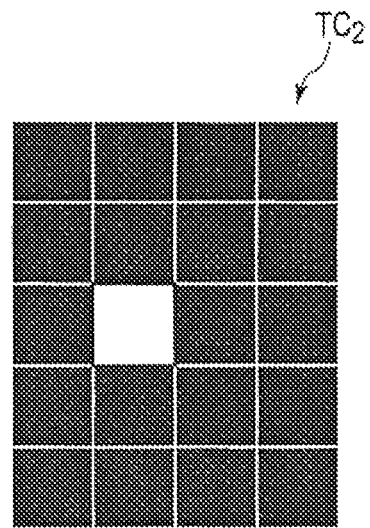
FIG. 17B illustrates an example of a pair of first and second test charts of the embodiment.

FIGS. 17A and 17B illustrate a test chart in which n is 1, and therein, FIG. 17A illustrates an example of the first test chart and FIG. 17B illustrates an example of the second test chart corresponding to FIG. 17A. The first test chart $TC_1$ of FIG. 17A includes a rectangular structure of 5×4 and includes two white pixels and 18 black pixels. The second test chart $TC_2$ of FIG. 17B includes, as with the first test chart $TC_1$, a rectangular structure of 5×4 and includes one white pixel and 19 black pixels. The first and second test charts $TC_1$ and $TC_2$ of FIGS. 17A and 17B correspond to a pair of first and second test charts in which the number of white pixels is minimum.

Furthermore, another specific example of a pair of the first and second test charts will be explained with reference to FIGS. 18A and 18B.

Figure 18A:
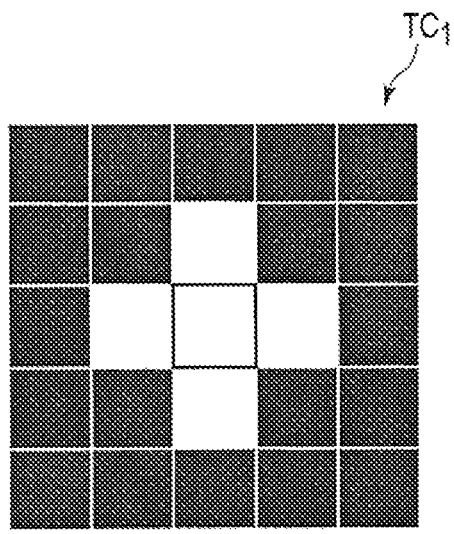
FIG. 18A illustrates another example of a pair of first and second test charts of the embodiment.
Figure 18B:
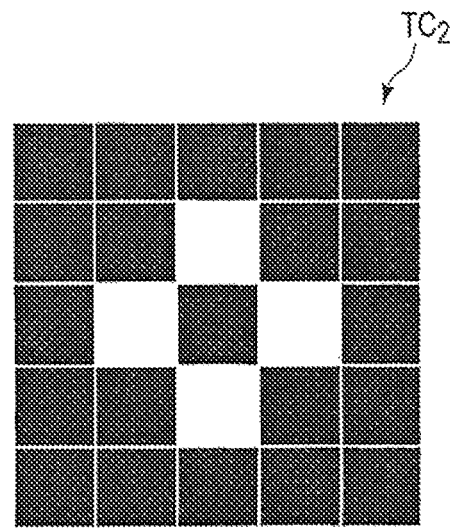
FIG. 18B illustrates another example of a pair of first and second test charts of the embodiment.

FIGS. 18A and 18B illustrate a test chart in which n is 4, and therein, FIG. 18A illustrates an example of the first test chart and FIG. 18B illustrates an example of the second test chart corresponding to FIG. 18A. The first test chart $TC_1$ of FIG. 18A includes a square structure of 5×5 and includes five cross-shaped white pixels and 20 black pixels around the cross-shaped white pixel. The second test chart $TC_2$ of FIG. 18B includes, as with the first test chart $TC_1$, a square structure of 5×5 and includes four cross-like shaped white pixels which is similar to that of FIG. 18A but one white pixel is replaced with one black pixel. The first and second test charts $TC_1$ and $TC_2$ of FIGS. 18A and 18B include more white pixels as compared to the first and second test charts $TC_1$ and $TC_2$ of FIGS. 17A and 17B. Thus, in consideration of an exposure time of the image capturing unit 51 (camera), image capturing in a short time can be performed.

Note that, in this example, as pairs of the first and second test charts $TC_1$ and $TC_2$, the structures of FIGS. 17A, 17B, 18A, and 18B are exemplified; however, the first and second test charts $TC_1$ and $TC_2$ may be structured optionally as long as a relationship that both the first and second test charts $TC_1$ and $TC_2$ include one or more white pixels and a difference between white pixels of the first and second test charts $TC_1$ and $TC_2$ is kept. Furthermore, several pairs of the first and second test charts $TC_1$ and $TC_2$ are prepared, and the pairs of the first and second test charts $TC_1$ and $TC_2$ may be switched to a suitable pair in accordance with the distance from the image capturing unit 51.

The image acquisition unit 72 instructs, when the display command is output with the first object image to the liquid crystal monitor from the image display instruction unit 71, the image capturing unit 51 to image-capture the first object image displayed on the liquid crystal monitor (outputs an image capturing command). The instruction may be a notification to prompt a user to capture the first object image. Note that the image display instruction unit 71 may have the function. The image acquisition unit 72 acquires the first captured image indicative of the first object image captured by the image capturing unit 51.

The image acquisition unit 72 has a function to instruct, when the display command is output with the second object image to the liquid crystal monitor from the image display instruction unit 71, the image capturing unit 51 to image-capture the second object image displayed in the liquid crystal monitor. The instruction may be a notification to prompt a user to capture the second object image. Note that the image display instruction unit 71 may have the function. The image acquisition unit 72 acquires the second captured image indicative of the second object image captured by the image capturing unit 51.

The first and second object images are captured in the same environment. That is, the first and second object images are captured in the environment where the distance from the image capturing unit 51 and ambient image are the same.

The PSF calculation unit 73 has a function to calculate a point spread function of one white pixel which in included in the first test chart $TC_1$ but not included in the second test chart $TC_2$ by acquiring a difference between the first and second captured images. Thereby, a true and accurate point spread function corresponding to a certain distance of the optical system of the image capturing unit 51 can be calculated.

Now, a mechanism to calculate a true and accurate point spread function will be explained.

In the following description, an object image including the first test chart $TC_1$, that is, the first object image including n+1 white pixels in an optional area x will be represented as $g_{n+1}(x)$, and influence of the backlight of the liquid crystal monitor lit to display the n+1 white pixels included in the first test chart $TC_1$ will be represented as $h_{n+1}(x)$. Furthermore, when ambient image influence at the time of image-capturing the first object image is represented as k(x), the first captured image will be represented as formula (7) as follows.

First captured image=$f*g_{n+1}(x)+h_{n+1}(x)+k(x)$     (7)

Figure 19:
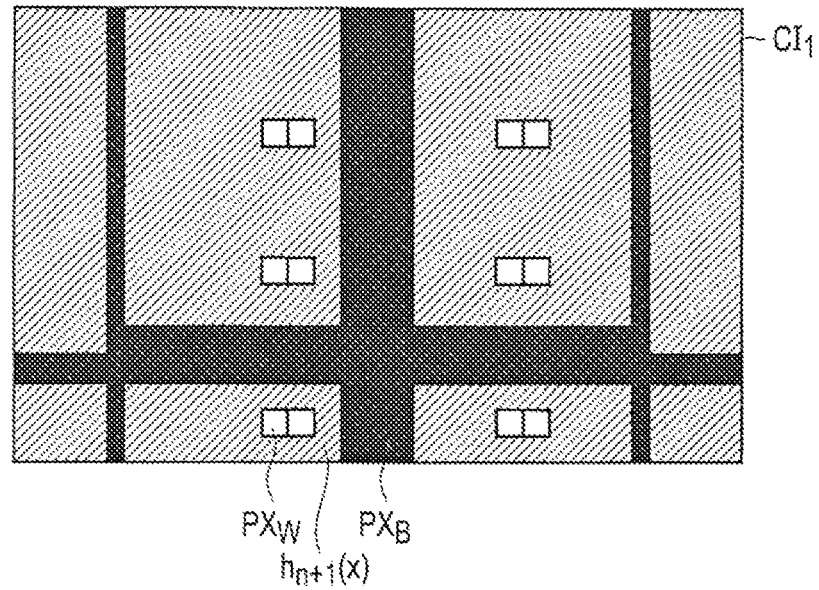
FIG. 19 illustrates an example of a first captured image acquired by image capturing a first object image displayed on the liquid crystal monitor of the embodiment.

As indicated in formula (7), the first captured image is generated by convolution of the point spread function corresponding to a distance between the image capturing unit 51 and the first object image (liquid crystal monitor) to the first object image, wherein influence by a backlight and ambient image influence are added to a result of convolution. FIG. 19 schematically illustrates a first captured image $CI_1$, wherein a white part represents a white pixel $PX_W$, a black part represents a black pixel $PX_B$, and a hatched part represents an influence $h_{n+1}(x)$ of the backlight.

Similarly, the second object image including the second test chart $TC_2$, that is, the second object image including n white pixels in an optional area x will be represented as $g_n(x)$, and influence of the backlight of the liquid crystal monitor lit to display the n white pixels included in the second test chart $TC_2$ will be represented as $h_n(x)$. Furthermore, when ambient image influence at the time of image-capturing the second object image is the same as the environment at the time of image-capturing the first object image, and thus, the point spread function and the ambient image influence convoluted in the second object image become formula (7) above. The second captured image will be represented as formula (8) as follows.

Second captured image=$f*g_n(x)+h_n(x)+k(x)$     (8)

Figure 20:
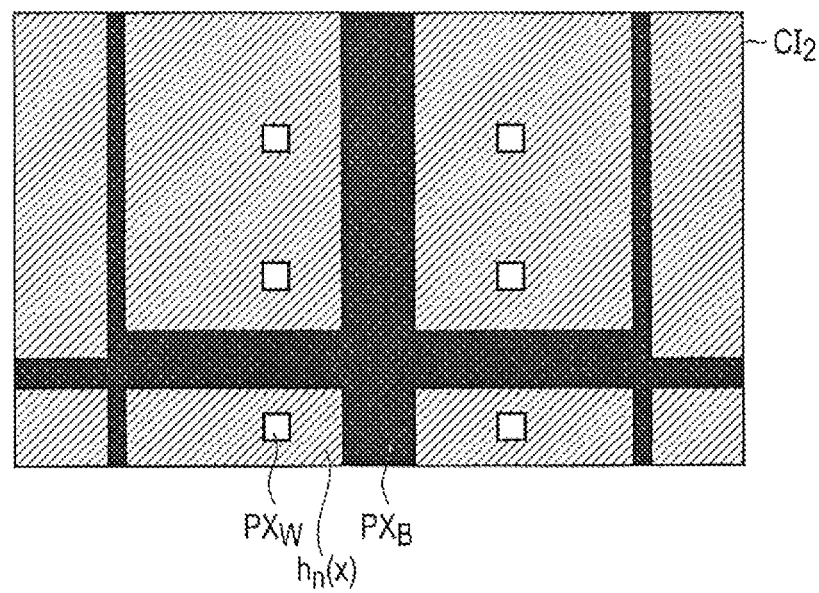
FIG. 20 illustrates an example of a second captured image acquired by image capturing a second object image displayed on the liquid crystal monitor of the embodiment.

FIG. 20 schematically illustrates a second captured image $CI_2$, wherein a white part represents a white pixel $PX_W$, a black part represents a black pixel $PX_B$, and a hatched part represents an influence $h_n(x)$ of the backlight. Note that FIGS. 19 and 20 illustrate examples of first and second captured images $CI_1$ and $CI_2$ captured when the first and second object images are in the focusing distance $d_f$. If the first and second object images are in a near side of or in a deep side from the focusing distance $d_f$, each area occupied by each of the parts $PX_W$, $PX_B$, and h(x) included in the first and second captured images $CI_1$ and $CI_2$ changes greatly when departing from the focusing distance $d_f$.

Based on formulae (7) and (8), a difference between the first and second captured images will be represented as formula (9) as follows.

$$\begin{aligned}\text{First captured image- second captured image} &= \{f*g_{n+1}(x) + \\ &\quad h_{n+1}(x) + k(x)\} - \\ &\quad \{f*g_n x) + \\ &\quad h_n(x) + k(x)\} \\ &= \{f*g_{n+1}(x) + \\ &\quad h_{n+1}(x)\} - \\ &= \{f*g_n x) + h_n(x)\}\end{aligned}$$ (9)

Since the first and second test charts $TC_1$ and $TC_2$ include one or more white pixels, and thus, the backlight is lit when either test chart is displayed, and since a difference between the white pixels included in the first and second test charts $TC_1$ and $TC_2$ is 1, the influence of the backlight lit to display n+1 white pixels and the influence of the backlight lit to n white pixels can be regarded as substantially the same. Thus, formula (9) can be rewritten into formula (10) as follows.

$$\begin{aligned}\{f*g_{n+1}(x)+h_{n+1}(x)\}-\{f*g_n x)+h_n(x)\} &= f*\{g_{n+1}(x)- \\ &\quad g_n(x)\} \\ &= f*g_1(x) \\ &= f(x)\end{aligned}$$ (10)

That is, as in formulae (9) and (10), by deriving a difference between the first captured image obtained when the first object image including the first test chart $TC_1$ is captured and the second captured image obtained when the second object image including the second test chart $TC_2$ is captured, the PSF calculation unit 73 can calculate a true and accurate point spread function corresponding to a certain distance of one white pixel which is included in the first test chart $TC_1$ but not included in the second test chart $TC_2$.

The PSF output unit 74 outputs PSF information indicative of the point spread function calculated by the PSF calculation unit 73 to various electronic devices (for example, image processing unit 12). Thus, when the PSF measurement unit 52 is incorporated in the image capturing device 1, the PSF measurement unit 52 can measure the point spread function of the optical system of the image capturing nit 11, and thus, the image capturing device 1 can generate blur correction filters based on the PSF information indicative of the point spread function of the optical system of the image capturing unit 11. That is, since the blur correction filters based on a measured value can be preliminarily prepared, accuracy of acquisition of a distance by the image capturing device 1 can be improved.

Note that the PSF information may indicate the measured value of the point spread function calculated by the PSF calculation unit 73, or may indicate, for example, a simplified measured value of the point spread function calculated by the PSF calculation unit 73 based on Gaussian function or Zernike polynomials.

FIG. 21 is a flowchart of an example of the PSF measurement process executed by the PSF measurement unit 52.

Initially, the image display instruction unit 71 reads a first object image to be stored in the nonvolatile memory 63 and outputs the first object image together with a display commands to the liquid crystal monitor (step S1). Through this step, the first object image is displayed on the liquid crystal monitor.

Then, the image display instruction unit 71 instructs the image capturing unit 51 to capture the first object image displayed on the liquid crystal monitor. When the first object image is captured based on the instruction, the image acquisition unit 72 acquires a first captured image $CI_1$ indicative of the first object image (step S2).

Then, the image display instruction unit 71 reads a second object image stored in the nonvolatile memory 63 and outputs the second object image together with a display command to the liquid crystal monitor (step S3). Through this step, the second object image is displayed on the liquid crystal monitor.

Then, the image display instruction unit 71 instructs the image capturing unit 51 to capture the second object image displayed on the liquid crystal monitor. When the second object image is captured based on the instruction, the image acquisition unit 72 acquires a second captured image $CI_2$ indicative of the second object image (step S4).

Then, the PSF calculation unit 73 calculates each point spread function corresponding to a distance to each white pixel which is a measurement target based on the first and second captured images $CI_1$ and $CI_2$ acquired by the image acquisition unit 72 (step S5).

Then, the PSF output unit 74 outputs PSF information indicative of each calculated point spread function to various electronic devices (step S6), and ends the PSF measurement process.

Note that the image processing device 50 may further include a movement mechanism which can move to a direction of a distance between an object and the image capturing unit 51 and a control unit configured to control the movement mechanism. Thereby, the distance d between the image capturing unit 51 and the object can easily be adjusted.

With the above-described embodiment, an image processing device 50 includes an image capturing unit 51 including an optical system and a PSF measurement unit 52. The PSF measurement unit 52 sequentially displays a first object image including a first test chart $TC_1$ and a second object image including a second test chart $TC_2$ on a liquid crystal monitor, and based on a first captured image $CI_1$ obtained by the image capturing unit 51 capturing the first object image, and a second captured image $CI_2$ obtained by the image capturing unit 51 capturing the second object image, a point spread function of the optical system of the image capturing unit 51 is measured.

Thus, measurement of the point spread function of the optical system of the camera (image capturing unit 51) can easily be executed.

Furthermore, since the measurement of the point spread function of the optical system of the camera can easily be executed, subsidiary effects that evaluation of optical performance of lens of camera and correction of lens aberration can easily be performed can be achieved.

Specifically, since the measurement of the point spread function of the optical system of the camera can easily be executed, as evaluation of the optical performance of the lens of the camera, imaging performance can easily be evaluated in a focusing position of the camera, and blur deterioration can easily be evaluated in the positions other than the focusing position of the camera.

Furthermore, since the measurement of the point spread function of the optical system of the camera can easily be executed, for example, single color aberration and color aberration can easily be corrected, and thus, an image deteriorated by the lens aberration can be restored to its original quality.

Furthermore, since the PSF measurement unit 52 can be incorporated in the image capturing device 1, the measurement of the point spread function of the optical system of the image capturing nit 11, and therein, a blur correction filter can be derived based on the measurement result, and thus, acquisition of a distance from the image-capturing position to the object by the image processing unit 12 can be performed with higher accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device, comprising:
a hardware processor implemented by one or more processors; wherein
the hardware processor:
acquires a first image of a first object and a second image of a second object which is different from the first object, the images captured by an image capture processing device including an image capturing element and an optical system which images an object image on an image capturing surface of the image capturing element; and
measures a point spread function of the optical system based on the first image and the second image,
the first object is an image including a first test chart having a rectangular shape comprising five pixels arranged in a longitudinal direction and four pixels arranged in a lateral direction, two pixels of twenty pixels constituting the first test chart being white pixels, the other eighteen pixels being black pixels,
the second object is an image including a second test chart having a rectangular shape comprising five pixels arranged in the longitudinal direction and four pixels arranged in the lateral direction, one pixel of twenty pixels constituting the second test chart being a white pixel, the other nineteen pixels being black pixels, and
the hardware processor measures the point spread function of the optical system based on a difference between the first image and the second image.

2. The image processing device of claim 1, wherein both the first object and the second object are images displayed on a liquid crystal monitor including a divided backlight.

3. The image processing device of claim 1, wherein
the two white pixels included in the first test chart are adjacent to each other, and
the second test chart is a test chart obtained by replacing one of the adjacent two white pixels included in the first test chart with a black pixel.

4. The image processing device of claim 1, wherein the hardware processor acquires a first color image indicative of a shape in which a blur function is not biased and a second color image indicative of a shape in which the blur function is biased, where the first color image and the second color image are obtained by further image capturing of a third object by the image capture processing device.

5. The image processing device of claim 4, wherein the hardware processor adds different blurs based on the measured point spread function to the second color image, generates a plurality of correction images, and calculates a distance to the third object based on a correlation between the first color image and the correction images.

6. An image processing method comprising:
acquiring a first image of a first object and a second image of a second object which is different from the first object, the images captured by an image capture processing device including an image capturing element and an optical system which images an object image on an image capturing surface of the image capturing element; and
measuring a point spread function of the optical system based on a difference between the first image and the second image,
wherein
the first object is an image including a first test chart having a rectangular shape comprising five pixels arranged in a longitudinal direction and four pixels arranged in a lateral direction, two pixels of twenty pixels constituting the first test chart being white pixels, the other eighteen pixels being black pixels, and
the second object is an image including a second test chart having a rectangular shape comprising five pixels arranged in the longitudinal direction and four pixels arranged in the lateral direction, one pixel of twenty pixels constituting the second test chart being a white pixel, the other nineteen pixels being black pixels.

7. The image processing method of claim 6, wherein both the first object and the second object are images displayed on a liquid crystal monitor including a divided backlight.

8. The image processing method of claim 6, wherein
the two white pixels included in the first test chart are adjacent to each other, and
the second test chart is a test chart obtained by replacing one of the adjacent two white pixels included in the first test chart with a black pixel.

9. The image processing method of claim 6, further comprising acquiring a first color image indicative of a shape in which a blur function is not biased and a second color image indicative of a shape in which the blur function is biased, where the first color image and the second color image are obtained by further image capturing of a third object by the image capture processing device.

10. The image processing method of dairy 9, further comprising: adding different blurs based on the measured point spread function to the second color image, generating a plurality of correction images, and calculating a distance to the third object based on a correlation between the first color image and the correction images.

11. An image processing device, comprising:
a hardware processor implemented by one or more processors; wherein
the hardware processor
acquires a first image of a first object and a second image of a second object which is different from the first object, the images captured by an image capture processing device including an image capturing element and an optical system which images an object image on an image capturing surface of the image capturing element; and
measures a point spread function of the optical system based on the first image and the second image,
the first object is an image including a first test chart having a square shape comprising five pixels arranged in a longitudinal direction and five pixels arranged in a lateral direction, five pixels of twenty-five pixels constituting the first test chart being white pixels adjacent to each other in a cross shape, the other twenty pixels being black pixels,
the second object is an image including a second test chart having a square shape comprising five pixels arranged in the longitudinal direction and five pixels arranged in the lateral direction, the second test chart being a test chart obtained by replacing one of the five white pixels adjacent to each other in the cross shape included in the first test chart by a black pixel, and
the hardware processor measures the point spread function of the optical system based on a difference between the first image and the second image.

12. The image processing device of claim 11, wherein both the first object and the second object are images displayed on a liquid crystal monitor including a divided backlight.

13. The image processing device of claim 11, wherein the hardware processor acquires a first color image indicative of a shape in which a blur function is not biased and a second color image indicative of a shape in which the blur function is biased, where the first color image and the second color image are obtained by further image capturing of a third object by the image capture processing device.

14. The image processing device of claim 13, wherein the hardware processor adds different blurs based on the measured point spread function to the second color image, generates a plurality of correction images, and calculates a distance to the third object based on a correlation between the first color image and the correction images.

15. An image processing method comprising: acquiring a first image of a first object and a second image of a second object which is different from the first object, the images captured by an image capture processing device including an image capturing element and an optical system which images an object image on an image capturing surface of the image capturing element; and measuring a point spread function of the optical system based on a difference between the first image and the second image, wherein the first object is an image including a first test chart having a square shape comprising five pixels arranged in a longitudinal direction and five pixels arranged in a lateral direction, five pixels of twenty-five pixels constituting the first test chart being white pixels adjacent to each other in a cross shape, the other twenty pixels being black pixels and the second object is an image including a second test chart having a square shape comprising five pixels arranged in the longitudinal direction and five pixels arranged in the lateral direction, the second test chart being a test chart obtained by replacing one of the five white pixels adjacent to each other in the cross shape included in the first test chart by a black pixel.

16. The image processing method of claim 15, wherein both the first object and the second object are images displayed on a liquid crystal monitor including a divided backlight.

17. The image processing method of claim 15, further comprising acquiring a first color image indicative of a shape in which a blur function is not biased and a second color image indicative of a shape in which the blur function is biased, where the first color image and the second color image are obtained by further image capturing of a third object by the image capture processing device.

18. The image processing method of claim 17, further comprising adding different blurs based on the measured point spread function to the second color image, generating a plurality of correction images, and calculating a distance to the third object based on a correlation between the first color image and the correction images.

* * * * *